Feb. 2, 1954　　　V. J. BURNELLI　　　2,668,027
AIRPLANE FLAP AND GROUND CONTACT CONTROL MEANS THEREFOR
Filed Aug. 10, 1948　　　3 Sheets-Sheet 1

INVENTOR
Vincent J. Burnelli
BY
Frederick R. Barker
ATTORNEY

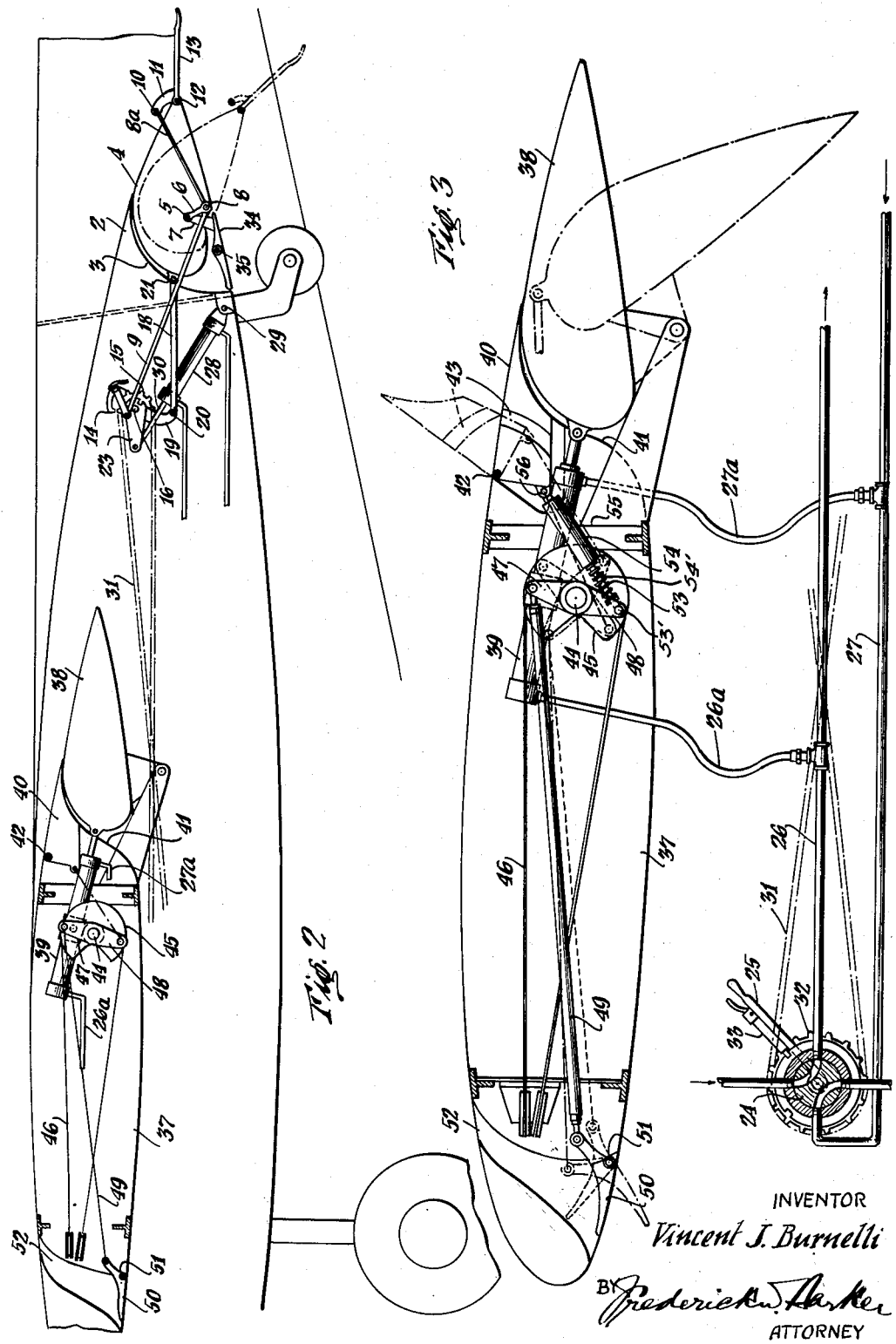

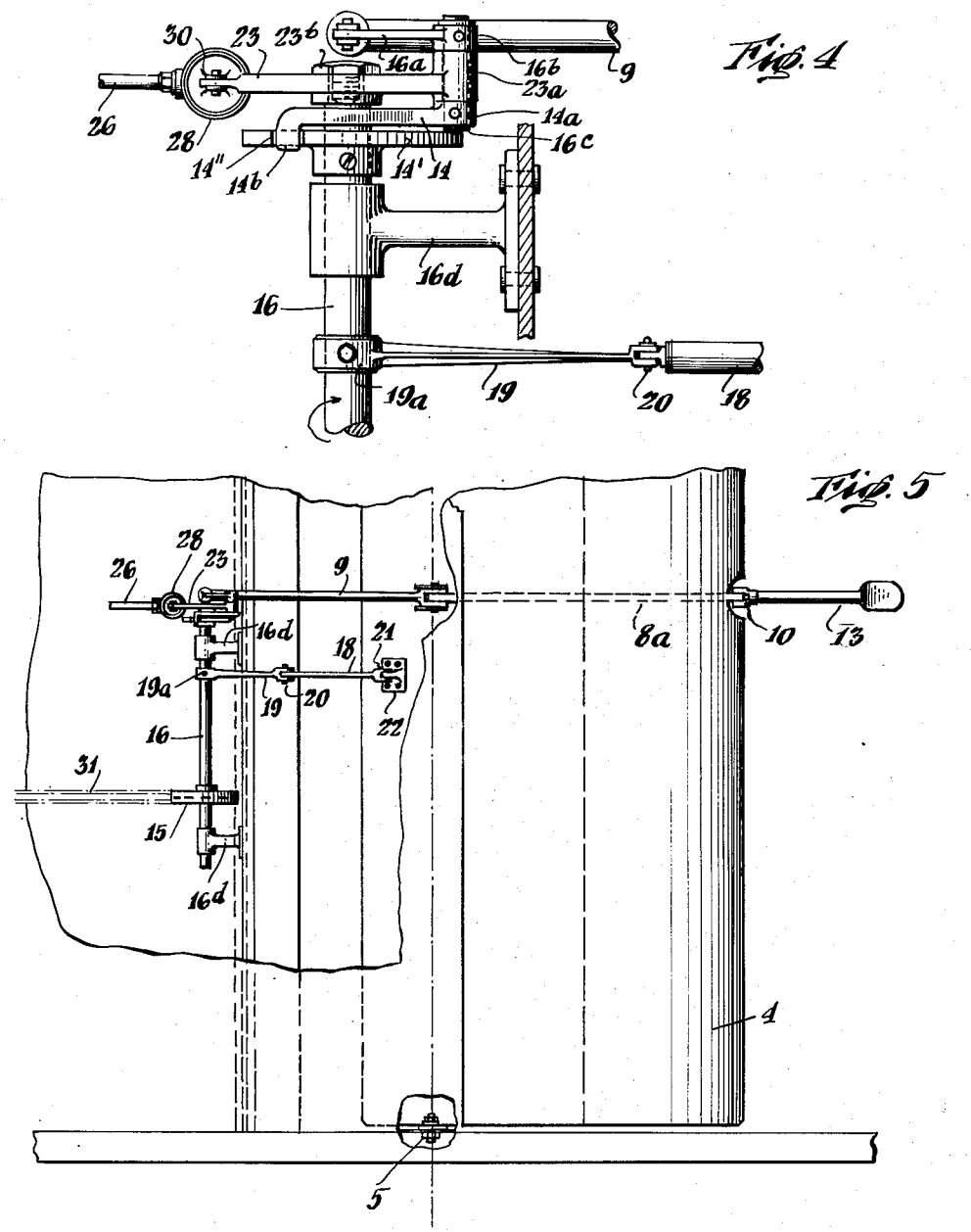

UNITED STATES PATENT OFFICE 2,668,027

AIRPLANE FLAP AND GROUND CONTACT CONTROL MEANS THEREFOR

Vincent J. Burnelli, Englewood, N. J.

Application August 10, 1948, Serial No. 43,503

5 Claims. (Cl. 244—81)

This invention relates to a device for rapid reduction in the lift of an airplane immediately following landing contact.

With an airplane of conventional type landing gear equipped with high lift full span flaps which at ground attitude present a high angle of attack and maximum lift to the wing system, it is considered of landing benefit to release the excess lift produced by the flaps at the moment of ground contact thereby increasing the percentage of the aircraft borne by the wheels for better brake action and to prevent the tendency to bounce or remain airborne when landings are made at comparatively high speed which is usually necessary for best control in gusty air conditions.

The present improved arrangement is as applied to a Burnelli lifting fuselage type equipped with a flap attached at the fuselage trailing edge section. A further benefit of this arrangement as applied to this type of airplane is that the flap can be used at high angles for maximum lift up to 60° in which position there would not be sufficient clearance from the ground unless the entire under carriage of the airplane was raised.

The release arrangement forming part of this application provides for returning the flap to normal take off position on ground contact. This release comprises an extension contact shaft which extends beyond the trailing edge of the flap and which makes advance contact with the surface to operate a mechanism that is related to the flap drive system and releases the positive drive of the flap so that by air and spring pressure it will rapidly return to neutral. This action of the flap release is synchronized with the operating valve or means for the manual opening of the wing flaps by the pilot. On ground contact of the extension shaft the fuselage flap snaps closed moving the hydraulic valve and reversing the oil flow in the wing flap cylinders so that they return to neutral at reduced speed. No ground clearance problem exists in the case of the wing flaps as with the fuselage flap. The synchronized action for releasing the wing flaps to a closed position also brings the operating cylinder or mechanism for the fuselage flap back to normal position where it engages the ratchet slot required for the release means so that when the pilot operates the lever for lowering the flaps all flaps move to the down position simultaneously. While the fuselage flap is primarily intended for high lift, it can also be adjusted to various degrees of angular position to trim the airplane for varied C. G. position when not employed for maximum lift landing requirements.

It is assumed that the lift will be reduced about 40% when the fuselage and wing flaps are rapidly closed within a few seconds after ground contact and that this reduction of lift will provide the main advantages that are achieved through the employment of a tricycle or negative type landing gear in which case the lift of the wings is relieved by the airplane assuming a negative angle or zero lift point of the wings during the ground roll following landing.

In connection with this application there is also provided a high lift device employing full span wing flaps and equipped with spoiler type lateral control means combined with the lift increase arrangement. This type of lateral control to make practical the employment of full span wing flaps provides for the angular operation of a portion of the trailing edge shroud which is necessary for the development of the proper wing flap slot contour for maximum lift.

A section of this trailing edge shroud for the required span of the spoiler control system is hinged forward of the trailing edge slot so that when the spoiler is operated it disturbs the proper slot contour airflow opening developing turbulence and air deflection which will destroy the high lift of the wing with the flap extended giving maximum control effect at slow speeds with open slot. At high speeds when the flap is closed the lateral rolling movement is not as critical and the spoiler operates with an applied down pressure and deflection upward to spoil the lift of the wing over the area covered by the spoiler thereby providing a down pressure on the airplane wings to effect lateral rolling moment correction.

Combined with this lateral control full span flap spoiler system means for providing lift increase to the lowered wing to co-act with the spoiler for increased rolling moment is provided also for increasing the drag of the wing opposite to that of the wing lift being neutralized by the spoiler to counteract the yaw or turning tendency created by the spoiler drag. This consists of a synchronized slot controller to intensify and regulate air flow through entering edge wing slots. The slot controller valve or vane when in the open position for maximum lift increase provides greater air drag and to a degree neutralizes the yaw or turning caused by the spoiler, also the air pressure provides balancing force to relieve operating pressure.

This lift increase slot controller is provided with a compensating drive inter-connected through the pilot's control wheel. A drive shaft connected to the spoilers at opposite wing tips operates the high lift entering edge slot vane which opens through levered arrangement on the wing opposite the spoilers. The slot vane floats in the slot opening and has no aerodynamic effect to increase the lift on the side on which the spoiler is in action. In combination with this co-ordination of control, means is provided for varying the opening of the high lift wing flap slot for different degrees of angular motion and slot opening. This is provided by spring pressure means located in the spoiler drive shaft. When the wing is closed for high speed attitude the spoiler which forms the slot duct in part remains in closed contact with the flap upper surface and compensating motion for operating the entering edge slot controller is permitted by spring means in the drive shaft allowing sufficient movement through the drive differential leverage. As the wing trailing edge slot opens the spoiler moves downward through this spring pressure and varies the degree of opening and improves the direction of air flow over the flap for maximum lift.

With the foregoing general objects, features and results in view, as well as certain others which will be apparent from the following explanation, the invention consists in certain novel features in design, construction, mounting and combination of elements, as will be more fully and particularly referred to and specified hereinafter.

In the drawings:

Figure 2 is a partial side elevation of a Burnelli type airplane whose lifting fuselage is provided with the flap of Fig. 1 and also showing a wing flap.

Figure 3 is an enlarged side elevation of a wing having a flap; also a spoiler and lift increase means adapted for purposes of lateral control; hydraulic system means also appearing in this view for flap operation, said system interconnecting the fuselage and wing flaps whereby the wing flaps are restored to neutral as a result of the automatic return of the fuselage flap.

Figure 4 is an enlarged plan view of the fuselage flap drive shaft and the means for releasably associating the hydraulic system therewith, parts of the elements being broken away.

Figure 5 is a plan view of the fuselage flap, with parts thereof being broken away, and of the mechanism illustrated in Fig. 4.

Figure 1:
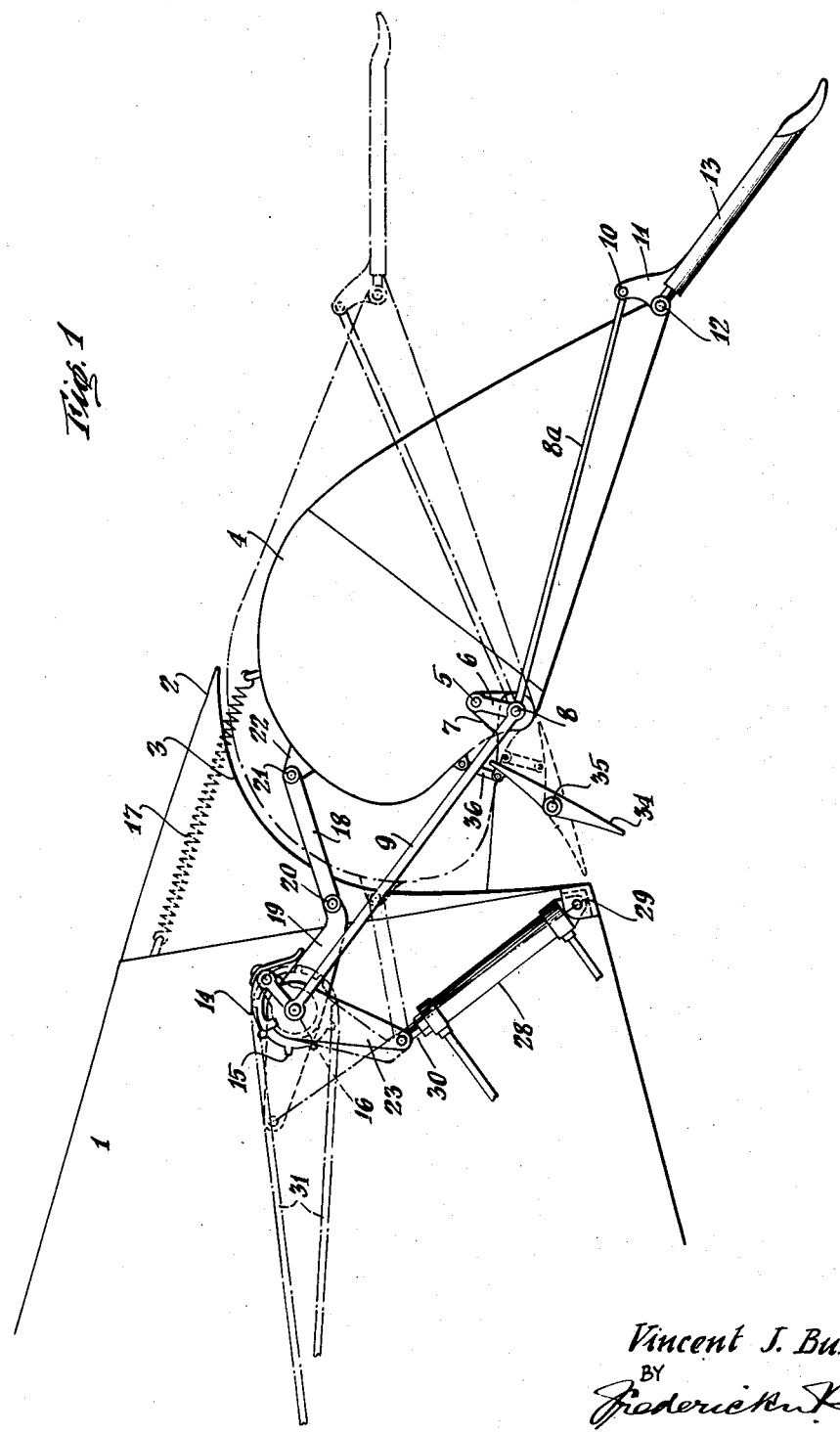
Figure 1 is a side elevation showing the trailing portion of a Burnelli type lifting fuselage having a flap and means for automatically restoring said flap to neutral from the down position on landing.

This application is a continuation in part of pending application filed by me July 18, 1945, Serial Number 605,802, now abandoned, for Airplane Flap and Lateral Control Means.

In Figures 1 and 2 I have used the numeral 1 to indicate a lifting fuselage of a Burnelli type airplane whose trailing portion 2 has a shroud 3 which receives a flap 4 that is swingably or rockably mounted in any conventional manner to the trailing portion of fuselage 1. An arm 6 is pivotally mounted as at 5 on bracket 7 which extends from said trailing portion. The arm 6 is jointed as at 8 to the respective push-pull rods 8a and 9. The rear rod 8a is pivoted at its opposite end as at 10 to a rocker plate 11, which rocker plate is pivoted at 12 to the trailing edge of the flap 4. An extension element or feeler rod 13 is fixed to the rocker plate and extends rearwardly therefrom in the air stream from the flap 4 and will therefor produce substantially no drag. The pivot for flap 4 is concentric or coincident with pivot or joint 8 when feeler rod 13 is in its neutral or undeflected position. With the flap in neutral position the extension element will extend in substantially horizontal position.

The forward push-pull rod 9 which is jointed as at 8 to arm or link 6 is pivotally connected at its opposite end to the lower end of a link or arm 16a having a collar 16b on the upper end thereof, which collar receives and is fixed to shaft 16c so that rod 9 is hung at its forward end from the link 16a. Shaft 16c pivotally mounts a collar 23a which is integrally formed on one end of a crank arm designated generally by the numeral 23, the crank arm as will be apparent from the description to follow constituting the supporting means for collar 23a and its associated elements. I provide a locking pawl 14 which is fixed at one end as at 14a to shaft 16c, the pawl 14 extending forwardly and provided with a lateral nose 14b on the forward end thereof. A ratchet disc 14' having a notch 14'' formed in the periphery thereof in position to receive the nose 14b of the pawl is provided and is fixed on flap drive shaft 16 for rotation therewith. The flap drive shaft 16 is supported by two or more brackets 16d which are supported in any suitable manner from the fuselage. The flap 4 is operatively connected with shaft 16 by the levers 18 and 19 which are jointed together as at 20, the lever 18 being pivoted as at 21 to a lug 22 extended from the flap and the lever 19 being fixed as at 19a to shaft 16.

A sprocket wheel 15 is fixed to shaft 16 for rotation therewith and said wheel is connected by a chain 31 with a further sprocket wheel 32 which may be operatively associated with an operating handle 25 by means of a detent 33 engageable in a notch in the sprocket wheel 32.

The hydraulic operating system for the flaps includes the valve 24, and the lines 26 and 27 which extend from the valve to opposite ends of the oil cylinder 28 which is pivotally mounted as at 29. The piston stem 30 is engaged by crank arm 23 as clearly illustrated in Fig. 1 of the drawings.

As hereinbefore discussed it is one of the objects of this invention to provide for the operation of wing flaps synchronously with the operation of the fuselage flap 4. In Figs. 2 and 3 of the drawings I have illustrated wing flaps 38 which are operated by an oil cylinder 39 in each wing 37, opposite ends of the cylinder being connected into the hydraulic system by means of pipes 26a and 27a which are connected to pipes 26 and 27, respectively. The synchronous operation of the flaps will be hereinafter explained.

The crank arm 23 is mounted for pivotal rocking movement on one end of shaft 16 by means of a floating bearing 23b on shaft 16.

When an aircraft equipped for automatic synchronous operation of the wing flaps and fuselage flap, in accordance with this invention, is landing and feeler 13 contacts the ground thereby rocking rocker plate 11, the push rods 8a and 9 are pushed forwardly about the center 5 and the arm 16a is thereby rocked to rotate shaft 16c by means of collar 16b which is fixed thereto. Rotation of shaft 16c rocks pawl 14 upwardly out of notch 14'' in ratchet disc 14' and the flap 4, shaft 16 and disc 14' are free of the hydraulic system. When this condition exists the flap 4 under air pressure, and spring means if desired, will return to neutral or raised position, and in so doing will, through the action of arms 18 and 19, cause rotation of shaft 16 in the direction of the arrow in Fig. 4 of the drawings. Since ratchet disc 14' is fixed to the shaft it will rotate therewith moving notch 14" to an upper position. The rotation of shaft 16 by the action of arms 18 and 19 will also rotate the sprocket 15 and control valve sprocket 32 through the action of chain 31 will likewise be rotated and handle 25 will be moved with the sprocket due to detent 33 being in sprocket wheel notch.

In Fig. 3 of the drawings valve 24 is shown in position assumed with the flap depressed, that is line 26 is the pressure line extending to the upper end of cylinder 28 to maintain crank arm 23 in retracted position, and to the forward end of cylinders 39 in the wings. When the shaft 16 rotates as described the valve 24 is rotated to reverse the fluid flow in the hydraulic system, thus, lines 27 and 27a become the pressure lines and the pistons in the cylinders will move to the opposite ends thereof to return the wing flaps 38 to neutral position synchronously with the fuselage flap.

This fluid reversal in cylinder 28 will project piston stem 30 and extend the crank arm 23, rocking it on bearing 23a and rocking or downwardly moving shaft 16c and its associated elements. This rocking movement about shaft 16 will bring the hook 14b of the pawl up and around to the upper position of notch 14" and it will fall thereinto again locking the flap control mechanism for depression of the flaps under the pilot's control.

In order to depress or drive the flaps down the pilot merely moves the operating handle to the position shown in Fig. 3 whereupon lines 26 and 26a become the pressure lines and the crank arm 23 is retracted, rocking on bearing 23a and since pawl 14 is in the notch in ratchet disc 14', the disc will be rotated back to the position shown in Fig. 4, rotation of the disc rotates the shaft 16 and the flap 4 will be driven down by arms or levers 18 and 19. It is to be understood that when the pilot moves handle 25 to full line position to drive the flaps downwardly he retracts the detent from the notch in sprocket wheel 32, so that the sprocket wheel is not rotated thereby, then when flap 4 is depressed the sprocket wheel will be rotated until the notch again receives the detent 33.

Increase in lift for the fuselage flap 4 is provided by the slot or gap which opens up between the flap and shroud as the flap is lowered, this slot receiving augmented pressure flow by means of a controller vane 34, pivoted at 35, that normally lies in slot closing position, but which, as the flap is lowered, opens the entrance to the slot and also serves as a scoop to increase drag and direct air flow through the slot. To this effect the vane 34 is pivotally connected with the flap by a link 36 whereby the movement of the flap to and from neutral and depressed positions are communicated to said vane.

The outspanned wings which extend from opposite sides of the lifting fuselage, one only appearing in the side view of Fig. 2, and bearing the reference numeral 37, are also provided with flaps 38, which may be full span flaps. On a larger scale one of said wings 37 is shown in Fig. 3, where also the hydraulic flap operating means is indicated.

For lateral control means, necessary both in normal flight and at times when the airplane is about to make a landing, I provide each wing with appropriate drag means for use when the wing is at the high side, and also with means of increased lift for use when it is at the low side. Thus, what I call a spoiler, indicated at 40, actually is a separated segment of the shroud 41, and is hinged at 42 so as to be capable of forming part of the shroud in the normal flying attitude of the airplane, or of being raised to the position shown in dotted lines in Fig. 3 to provide drag. If at such time the flap 38 is lowered as for slow landing, thus creating a slot opening between the flap and shroud, holes or a slot 43 through the spoiler will enable a cross flow through said holes to intensify turbulence in the slot thereby assisting to destroy lift of the wing at the high side.

Mounted on a transverse shaft 44 is a pulley segment 45 which is operated by a cable 46 that extends to the cockpit for actuation by the pilot. Also carried by said shaft 44 are arms 47, 48, the arm 47 pivotally engaging a rod 49 whose other end is in pivotal engagement with a vane 50 that is pivoted at 51 adjacent a slot 52 located near the entering edge of the wing, for the control of said slot. Normally vane 50, as seen in full lines, nearly closes slot 52, and, as will be noted it has two other positions, both shown in dotted lines, one where it closes the slot and the other where it fully opens the slot and also serves as a scoop to permit air flow over the wing for lift purposes when the wing is at the low side, to counterbalance the drag afforded the other wing by the raised spoiler at the high side.

It should be appreciated that when the spoiler is elevated to provide drag for the wing at the high side, then vane 50 on this high side is able to float between its position of full and partial closure, but when the vane 50 for the wing on the low side is moved to its full slot open position. The butt or inner end of spoiler 40 is pivotally connected to an actuating rod 54' as at 56. The opposite end of rod 54' is pivotally connected as at 53' to drive arm 48 and the actuating rod is slidably encased by a tube 54. A compression spring 53 lies between an end of the tube and the pivot 53'. In consequence, when pulley segment 45 is rotated in one direction, rod 54', which engages the spoiler at 56, is caused to pull the spoiler down into its slot closing position in the shroud, and because of the yield afforded by spring 53 said spoiler may depress into the flap slot with spring slack while vane 50, influenced by rod 49 is enabled to float between its nearly and fully closed positions with respect to slot 52.

I claim:

1. In an airplane, flaps and flap operating and controlling means, and an extension member pivotally carried on a flap and extending from the trailing edge of the flap in the air stream therefrom when the flap is closed, said extension member and said flap operating and controlling means operatively connected together, said member adapted to make surface contact preceding a landing when the flap is depressed, surface contact of said extension member causing pivotal movement thereof on the flap, and said flap operating and controlling means actuated by the pivotal movement of said extension member for permitting closing of the flap.

2. In an airplane, a fuselage flap and operating means therefor, an extension member pivotally mounted on and extending from said fuselage flap and adapted to make surface contact preceding a landing when the fuselage flap is depressed, such surface contact by said extension member inducing pivotal movement thereof on the flap, means for releasing said flap from depressed position for return to normal position, and linkage mechanism operatively connected to said extension member and said flap release means and positively actuated by said extension member in its pivotal movement induced by surface contact to operate said flap release means.

3. In an airplane, a fuselage flap and operating means therefor, an extension member pivotally mounted on and extending from said fuselage flap and adapted to make surface contact preceding a landing when the fuselage flap is depressed, such surface contact by said extension member inducing pivotal movement thereof on the flap, releasable locking means for maintaining the flap in depressed position, means for releasing said flap from locked depressed position for return to normal position including push rods mechanically connected with said extension member and with said releasable locking means and actuable by pivotal movement of the extension member to trip said locking means permitting said flap to return to normal position.

4. In a lifting fuselage airplane, a fuselage flap, wing flaps and flap operating mechanism, an extension member pivotally mounted on and extending from said fuselage flap and adapted to make surface contact preceding a landing when the fuselage flap is depressed, such surface contact by said extension member inducing pivotal movement thereof on the flap, releasable locking means for maintaining the flap in depressed position, means for releasing said flap from locked depressed position for return to normal position including push rods associated with said extension member and actuable by pivotal movement thereof to trip said locking means permitting said flap to return to normal position, and rotary means actuated by the return of said fuselage flap to normal position for simultaneously operating mechanism causing the closing of the wing flaps.

5. In a lifting fuselage airplane, a fuselage flap, wing flaps and hydraulic flap operating mechanism including a valve operable to reverse the fluid flow for changing the positions of the flaps, an extension member pivotally mounted on and extending from said fuselage flap and adapted to make surface contact preceding a landing when the fuselage flap is depressed, such surface contact by said extension member inducing pivotal movement thereof on the flap, releasable locking means for connecting the hydraulic system with the fuselage flap for maintaining said flap depressed, and mechanism operatively connected with the releasable locking means and the extension member and actuated by the pivotal movement of the extension member to release the locking means and disconnect the hydraulic system from the fuselage flap for the return of the flap to neutral position, and rotatable means, connected with and actuated by the return of the fuselage flap to neutral position, to operate the valve to reverse the flow of fluid in the hydraulic system to cause the wing flaps to return to neutral position.

VINCENT J. BURNELLI.

References Cited in the file of this patent

UNITED STATES PATENTS

| Number | Name | Date |
|---|---|---|
| 1,998,487 | Burnelli | Apr. 23, 1935 |
| 2,070,006 | Eaton, Jr., et al. | Feb. 9, 1937 |
| 2,173,273 | De Seversky | Sept. 19, 1939 |
| 2,276,522 | Staufer | Mar. 17, 1942 |

FOREIGN PATENTS

| Number | Country | Date |
|---|---|---|
| 846,337 | France | June 5, 1939 |